United States Patent [19]
Hurlburt et al.

[11] Patent Number: 5,794,956
[45] Date of Patent: Aug. 18, 1998

[54] PIVOTABLE FENDER FOR TRACTORS

[75] Inventors: Joseph C. Hurlburt, Lancaster; Gilbert W. Linde, New Holland, both of Pa.

[73] Assignee: New Holland North America, Inc., New Holland, Pa.

[21] Appl. No.: 895,294

[22] Filed: Jul. 16, 1997

[51] Int. Cl.$^6$ ............................................ B62D 25/18
[52] U.S. Cl. ..................... 280/156; 280/157; 280/96.1; 296/198
[58] Field of Search ......................... 280/156, 157, 280/854, 847, 848, 900, 96.1, 96.3, 97, 760, 849, 853, 152.05, 154; 296/198; 246/299; 172/112, 508, 509

[56] References Cited

U.S. PATENT DOCUMENTS

| 415,021 | 11/1889 | Brown | 280/157 |
|---|---|---|---|
| 5,074,573 | 12/1991 | Dick | 280/257 |
| 5,169,167 | 12/1992 | Willson e al. | 280/157 |
| 5,511,808 | 4/1996 | Rowland | 580/157 |

Primary Examiner—Richard M. Camby
Attorney, Agent, or Firm—Larry W. Miller; J. William Stader; Frank A. Seemar

[57] ABSTRACT

A pivotable tractor fender assembly permits the fender to follow the turning movements of the front wheels of a tractor, yet be pivotable relative to the corresponding front wheel so that the fender will not engage the chassis of the tractor. A fixed control link is pivotally connected between the fender base and the front axle to provide a fixed distance between the respective connection points. The control link will limit the pivotal movement of the fender and effect a relative pivotal movement thereof relative to the corresponding front wheel as the front wheel is turned. The geometry of the pivotable fender assembly is such that the fender lags more behind the corresponding front wheel during an inboard turn than during an outboard turn. This geometry prevents the pivoted fenders from impacting the tractor chassis on tight turns.

19 Claims, 11 Drawing Sheets

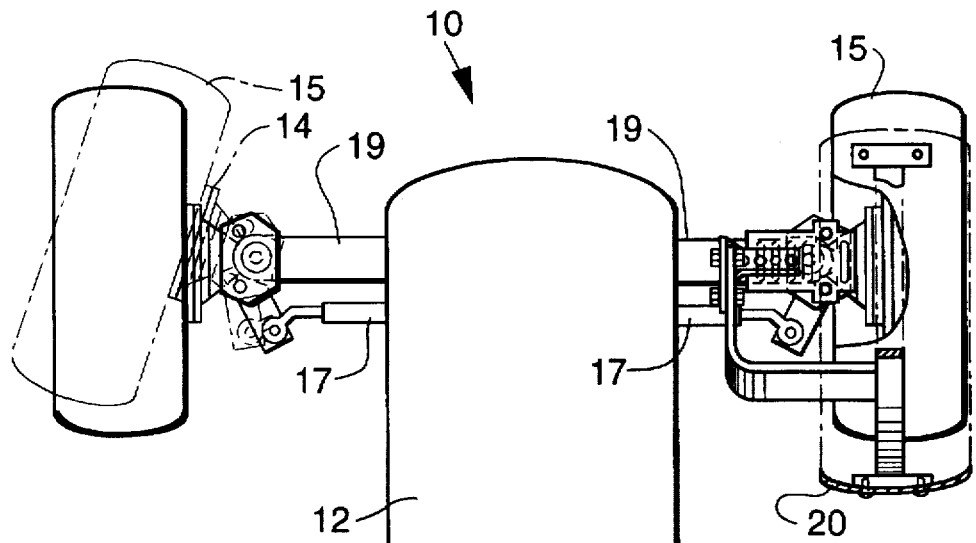
Fig. 1
PRIOR ART
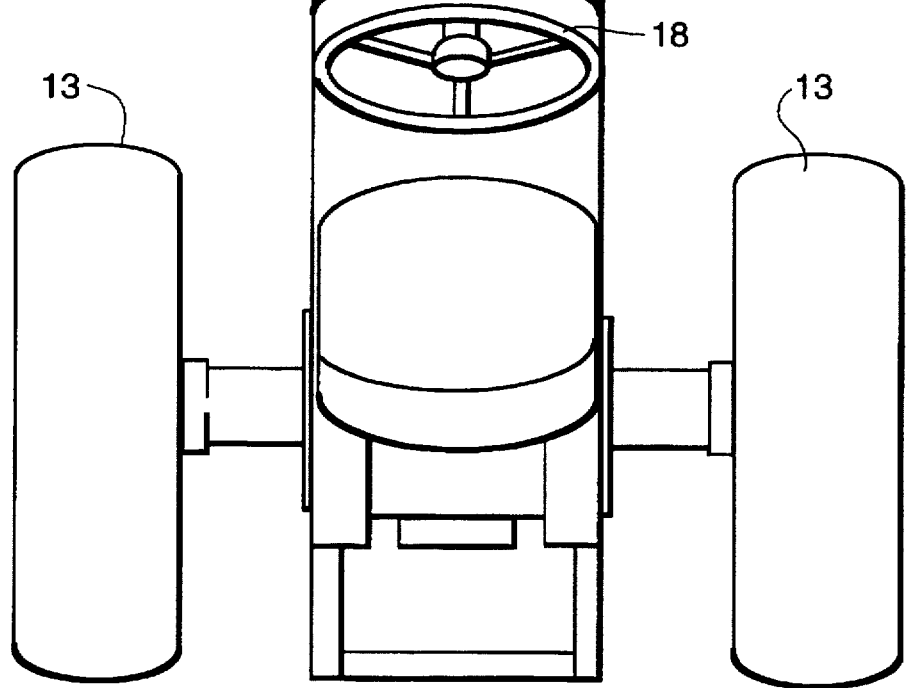

PIVOTABLE FENDER FOR TRACTORS

The applicant hereby claims the benefit of filing under 35 U.S.C. 119(e) of provisional application number 60/025,325 filed Sep. 6, 1996.

BACKGROUND OF THE INVENTION

Agricultural tractors, such as those shown in U.S. Pat. No. 5,169,167, issued on Dec. 8, 1992, to L. D. Willson, et al, are powered for movement over the ground, which may be steered in a conventional manner by pivoting the front wheels relative to the front axle on which the front wheels are rotatably mounted about a king pin axis. Steering mechanisms are well known in the vehicle arts and the geometry of which is such that the inboard front wheel on any particular turn is pivoted at a greater angle than the outboard front wheel. One skilled in the art will understand that tractor wheels are capable of being mounted on the tractor in various locations to permit the transverse spacing between the front, as well as the rear, wheels to be varied according to the spacing between the rows of crop material through which the tractor is to be run.

As taught in the aforementioned U.S. Pat. No. 5,169,167, the front wheels are often covered with a fender mechanism to prevent the spraying of material from the corresponding tire rearwardly therefrom. Preferably, the fender mechanisms are mounted in an adjustable manner so that the fender can be properly positioned relative to the corresponding tire to provide the desired protection. Under certain conditions, such as when the front wheels are set at a relatively narrow transverse spacing, the fender mechanism, which projects generally upwardly and rearwardly of the corresponding front wheel, can impact the chassis of the tractor during hard turns. This is particularly true for the inboard front wheel on a hard turn due to the greater angular rotation of the inboard wheel relative to the front axle.

Several mechanisms have been devised to effect a pivotal rotation of the fender mechanism relative to the corresponding wheel to move the fender out of the way of the chassis during hard turns of the tractor. One such mechanism can be found in U.S. Pat. No. 5,074,573, which utilizes a spring to mount the fender to the corresponding front wheel. A stop member supported by the chassis engages the spring-loaded fender assembly to effect a pivotal movement thereof when the inboard front wheel has rotated a given amount. The fender spring returns the fender to its normal position after the front wheels have been rotated sufficiently to disengage the fender from the stop.

An alternative mechanism also utilizes a spring-loaded fender mechanism; however, the stop is eliminated so that the fender directly engages with the tractor chassis to effect a pivotal movement of the fender relative to the corresponding wheel. While both of these mechanisms serve to protect the fender and chassis from major damage due to a non-yielding fender, the rubbing engagement between the fender and the chassis requires special protective plates to prevent minor damage to the paint and finish of both the fender and the tractor chassis.

It is desirable to provide a tractor fender pivot mechanism that will effect a pivotal movement of the fender when the front wheels are steered in either direction. Under certain circumstances and wheel spacing geometry, the fender can impact the chassis even when the front wheel is the outboard wheel on a particular turn. It is further desirable that the fender, like the corresponding front wheel, pivot a greater amount on an inboard turn than on an outboard turn.

SUMMARY OF THE INVENTION

It is an object of this invention to overcome the aforementioned disadvantages of the prior art by providing a pivotable tractor fender mechanism that will permit the fender to follow the turning of the corresponding wheel during turning movements thereof.

It is another object of this invention to provide a pivotable tractor fender mechanism that can effect a greater amount of pivotal movement during an inboard turn than during an outboard turn.

It is a feature of this invention that the pivotable tractor fender mechanism is particularly adaptable to the steering movements of the tractor equipped with a compound steering mechanism.

It is an advantage of this invention that the pivotable fender will follow the tractor wheels closely during turning movements.

It is still another object of this invention that the pivotable fender mechanism will lag in terms of degrees of rotation is greater for a given amount of angular rotation on an inboard turn than for the same amount of angular rotation on an outboard turn.

It is another feature of this invention that the fender moves toward the tractor chassis slower than the corresponding front tire and effectively pivots away from the chassis relative to the tire during turns without requiring an engagement between the fender and the chassis.

It is another advantage of this invention that the geometry for the pivotable tractor fender allows the fender to lag away from the tractor chassis during inboard turns.

It is still another object of this invention that the pivot geometry minimizes damage to fenders due to engagement with the chassis during tight inboard turns.

These and other objects, features, and advantages are accomplished according to the instant invention by providing a pivotable tractor fender assembly that permits the fender to follow the turning movements of the front wheels of a tractor, yet be pivotable relative to the corresponding front wheel so that the fender will not engage the chassis of the tractor. A fixed control link is pivotally connected between the fender base and the front axle housing to provide a fixed distance between the respective connection points. The control link will limit the pivotal movement of the fender and effect a relative pivotal movement thereof relative to the corresponding front wheel as the front wheel is turned. The geometry of the pivotable fender assembly is such that the fender lags more behind the corresponding front wheel during an inboard turn than during an outboard turn. This geometry prevents the pivoted fender from impacting the tractor chassis on tight inboard turns.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a top plan view of an agricultural tractor showing the environment on which the instant invention is applicable;

DESCRIPTION OF THE INVENTION

Figure 2:
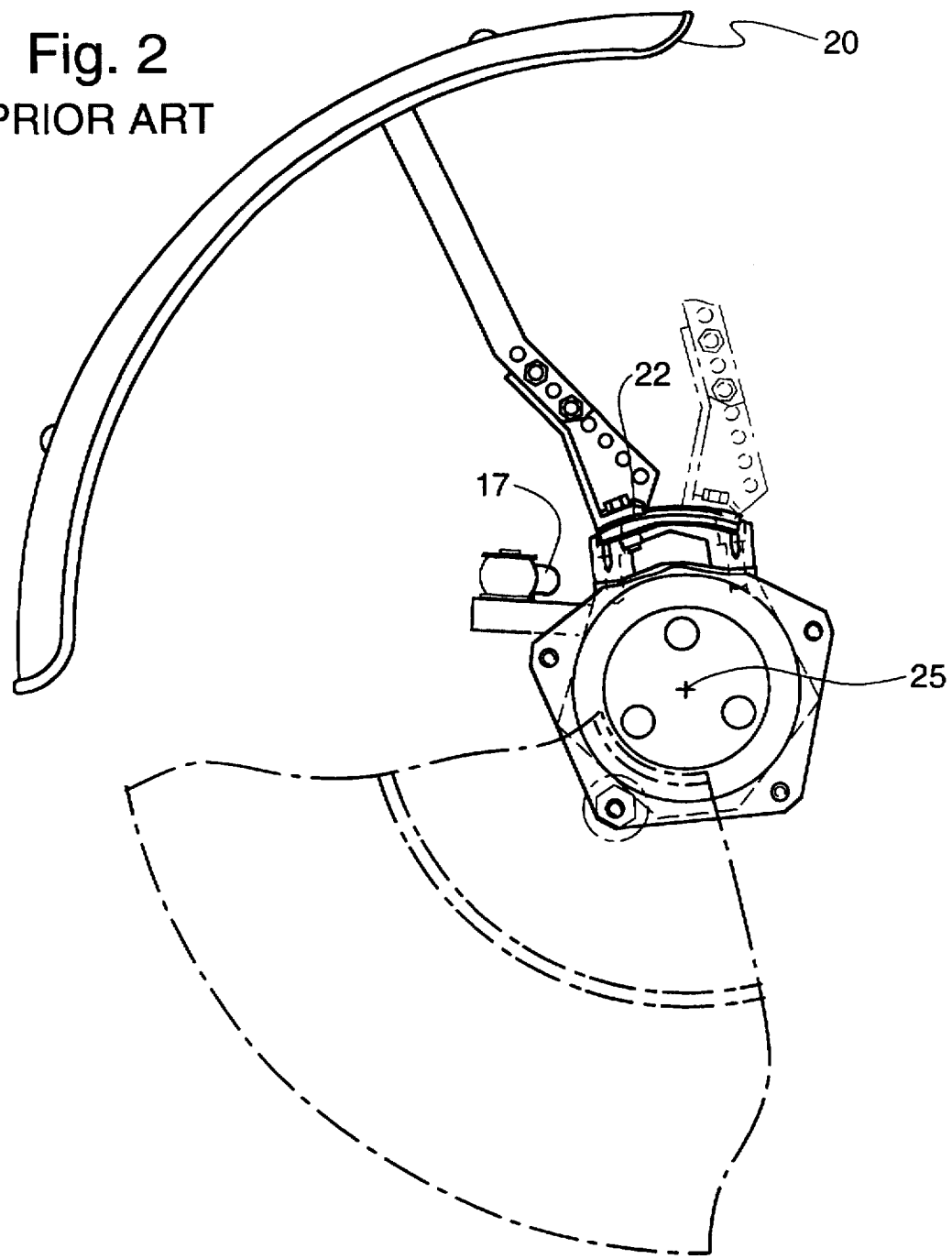
FIG. 2 is a side elevational view of the prior art mounting of a fender mechanism in a manner to be adjustable relative to the corresponding front wheel.
Figure 3A:
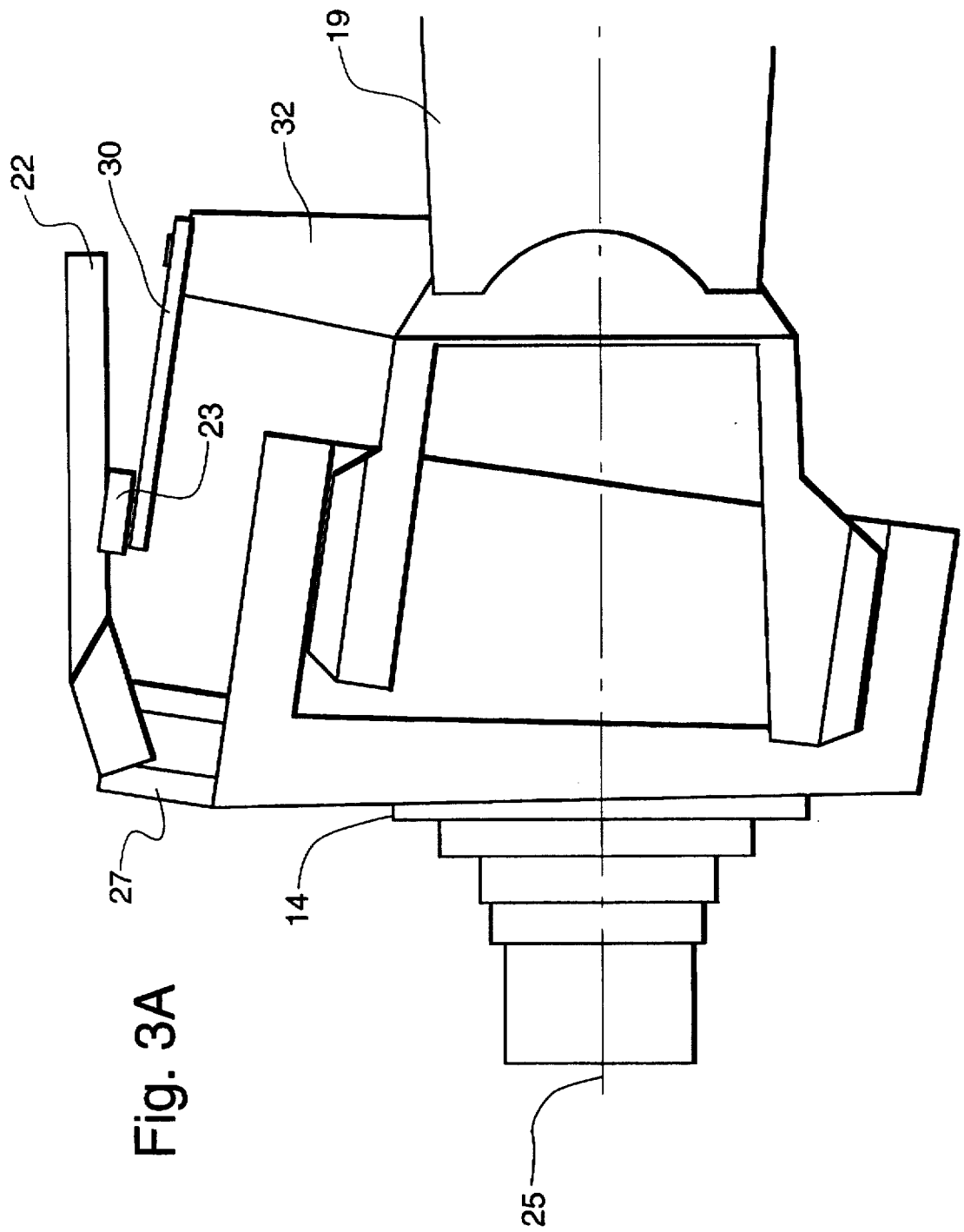
FIG. 3A is an enlarged rear elevational view of the fender pivot control mechanism incorporating the principles of the instant invention for the left front wheel of the tractor, the components are oriented in a no-turn, straight-ahead configuration.
Figure 3B:
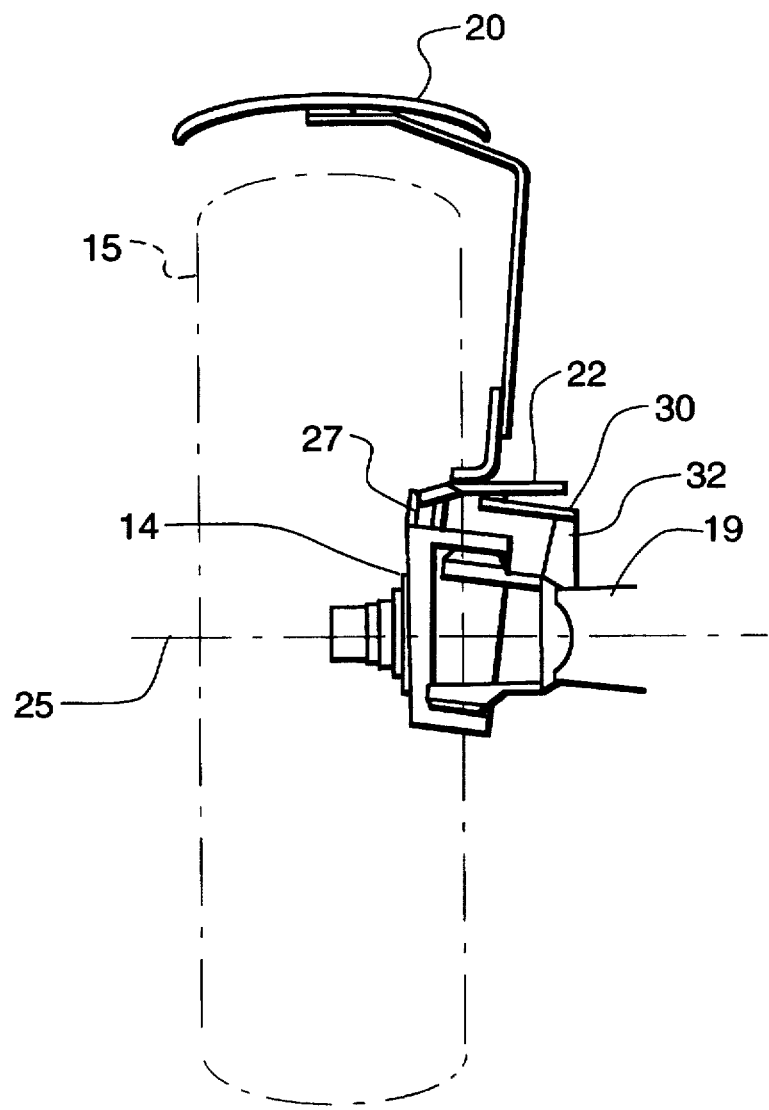
FIG. 3B is a rear elevational view of the fender pivot control mechanism similar to that of FIG. 3A, except on a reduced scale to show the relationship between the fender pivot control mechanism and the front axle and fender, the corresponding wheel being shown in phantom.
Figure 4A:
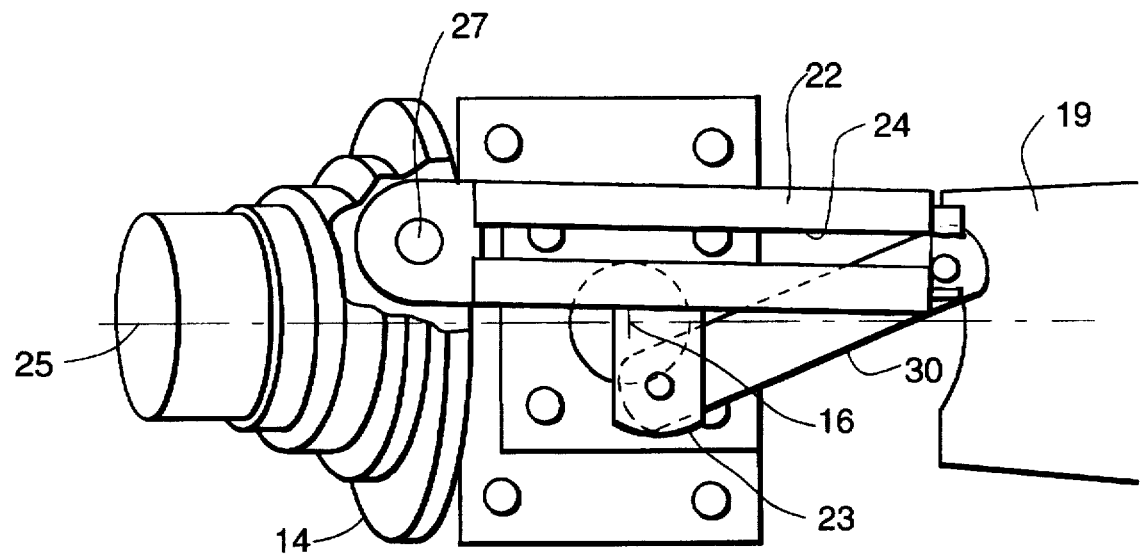
FIG. 4A is an enlarged top plan view of the fender control mechanism shown in FIG. 3A.
Figure 4B:
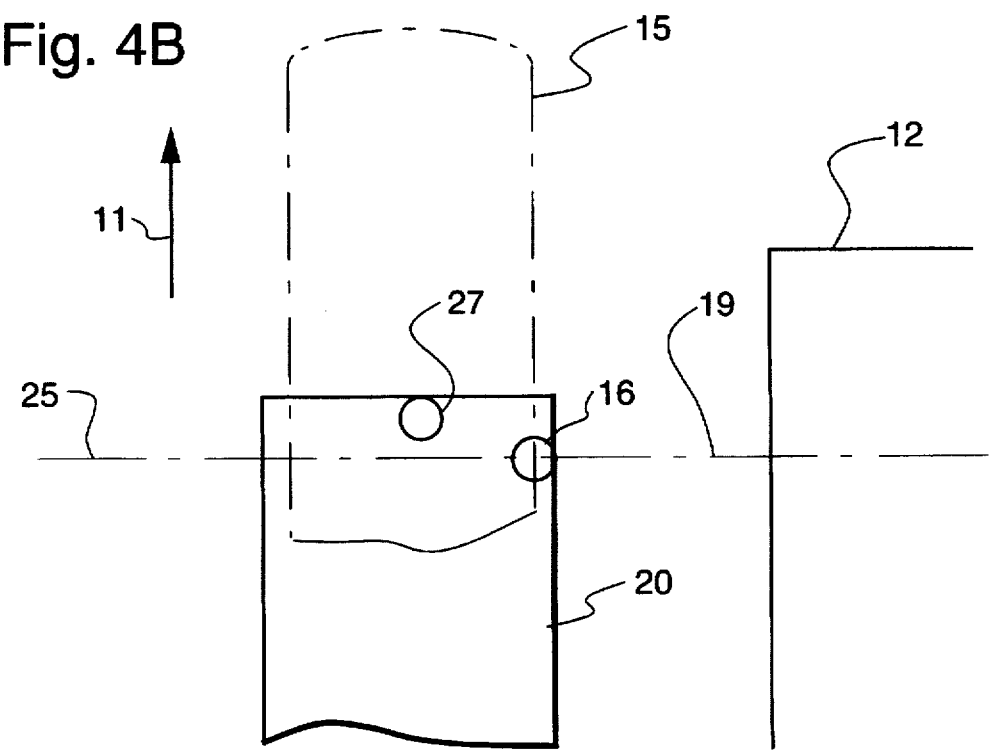
FIG. 4B is a schematic plotting of the pivot centers, front axle, fender and tractor chassis corresponding to the view of FIG. 4A to depict the relative relationship therebetween, the forward direction of travel being shown by an arrow.

Referring to FIGS. 1–6B, the front fender pivot control mechanism incorporating the principles of the instant invention can best be seen. Any left and right references are used as a matter of convenience and are determined by standing at the rear of the tractor facing forwardly into the normal direction of travel. For purposes of clarity with respect to depicting the steering movement of the wheel 15, the left front wheel 15 in FIG. 1 is depicted without a fender 20, while the right front wheel 15 depicts a fender structure 20. FIGS. 3A–6B, 8 and 9 show only the left front wheel 15 and associated fender structure 20 for demonstrative purposes, one skilled in the art will readily understand that the opposing right front wheel 15 and associated fender structure 20 will be essentially mirror images of the right front wheel structure 15 shown in the drawings. Obviously, the left and right front wheels 15 operate simultaneously through the conventional tractor steering mechanism 17.

Referring to FIGS. 1 and 2, one skilled in the art will recognize the environment on which the instant invention is utilized. The agricultural or industrial tractor 10 is mobilely supported over the surface of the ground by a pair of opposing steerable front wheels 15 rotatably mounted on the front axle 19 in a conventional manner and a pair of rear driven wheels 13. Rotation of the front wheels 15 relative to the front axle 19 is accomplished in a conventional manner by a steering mechanism 17. Typically, the front fenders 20 are supported from the corresponding wheel structure so as to be rotatable therewith relative to the front axle 19. The fenders 20 can be adjustably mounted relative to the corresponding front wheel 15 so that the fender 20 can be positioned relative to the corresponding front wheel 15 in the most desirable orientation relative thereto. Greater details of this adjustable mounting of the fender 20 can be found in U.S. Pat. No. 5,169,167, the description of which is incorporated herein by reference.

Referring now to FIGS. 3A–6B, the principles of the instant invention can best be seen. The fender 20 is mounted on a fender base 22 which is provided with a slot 24 to permit the variable positioning of the fender 20 transversely. Adjustable positioning of the fender 20 relative to the rotational axis 25 of the corresponding front wheel 15 requires an intermediate bracket, not shown, to allow movement of the fender 20 relative to the fender base 22. The variable positioning of the front fender 20 relative to the corresponding front wheel 15 is not considered to be crucial to the instant invention and will not be described further.

The fender base 22 is pivotally supported by a fender pivot 27 on the spuckle 14, which is the casting rotatably mounting the front wheel 15 and forms a part of the corresponding front wheel structure that pivots about the kingpin axis 16 relative to the front axle 19. Accordingly, the fender pivot 27 is rotated with the spuckle 14 about the kingpin axis 16. A control link 30 is pinned at one end to a support flange 32 forming a part of the front axle 19. The opposing end of the control link 30 is pivotally connected to the fender base 22 at a position spaced inboard of the fender pivot 27. Preferably, the fender base 22 is formed with a link pivot member 23 for pivotal connection to the control link 30 beneath the fender base 22 so as to not interfere with the adjustable mounting of the fender 20 to the fender base 22.

One skilled in the art will readily recognize that the location of the link pivot member 23 relative to the fender pivot 27 provides the appropriate geometry for the rotation of the fender 20 differently on inboard versus outboard turns. Preferably, the fender pivot 27 is located outboard of the kingpin axis 16, while the link pivot member 23 is positioned inboard and rearwardly of the kingpin axis 16. This configuration provides the fender lag, i.e. the rotation of the fender 20 relative to the rotation of the corresponding front wheel 15 about the kingpin axis 16, as graphically depicted in FIG. 7.

Figure 5A:
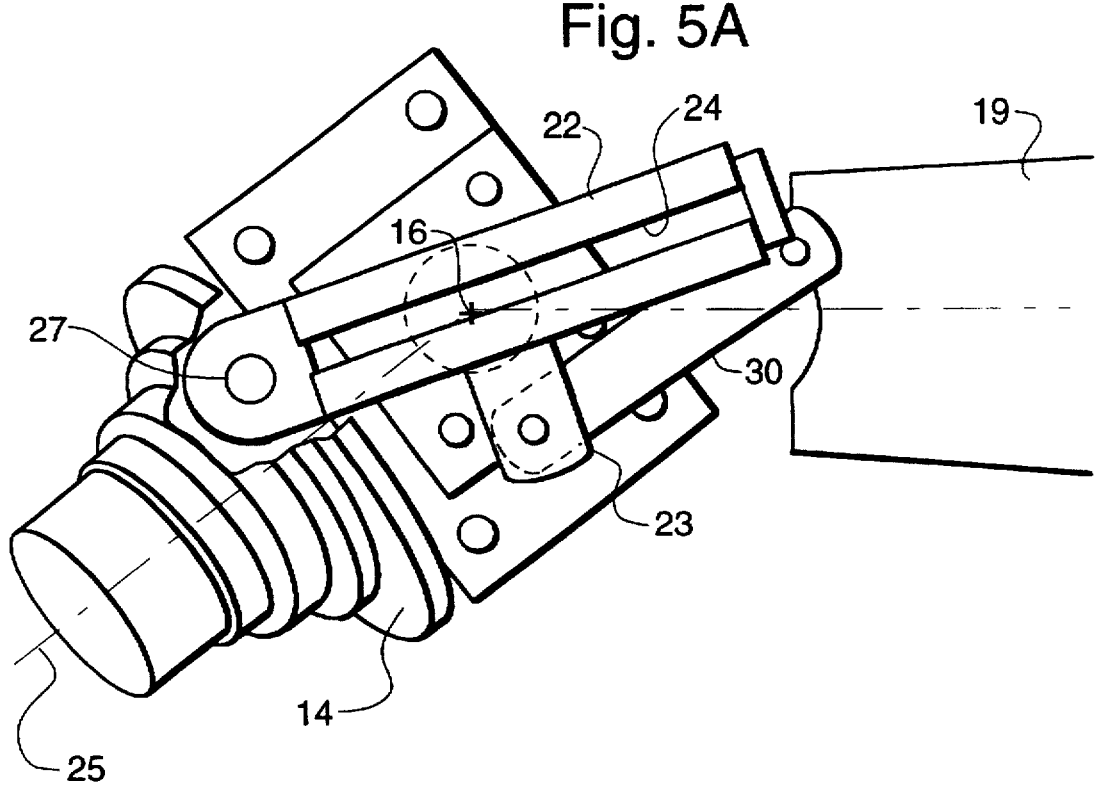
FIG. 5A is an enlarged top plan view of the fender control mechanism similar to that of FIG. 4A, except that the left front wheel has been rotated to effect a left turn so that the left front wheel becomes the inboard wheel on the turn.
Figure 5B:
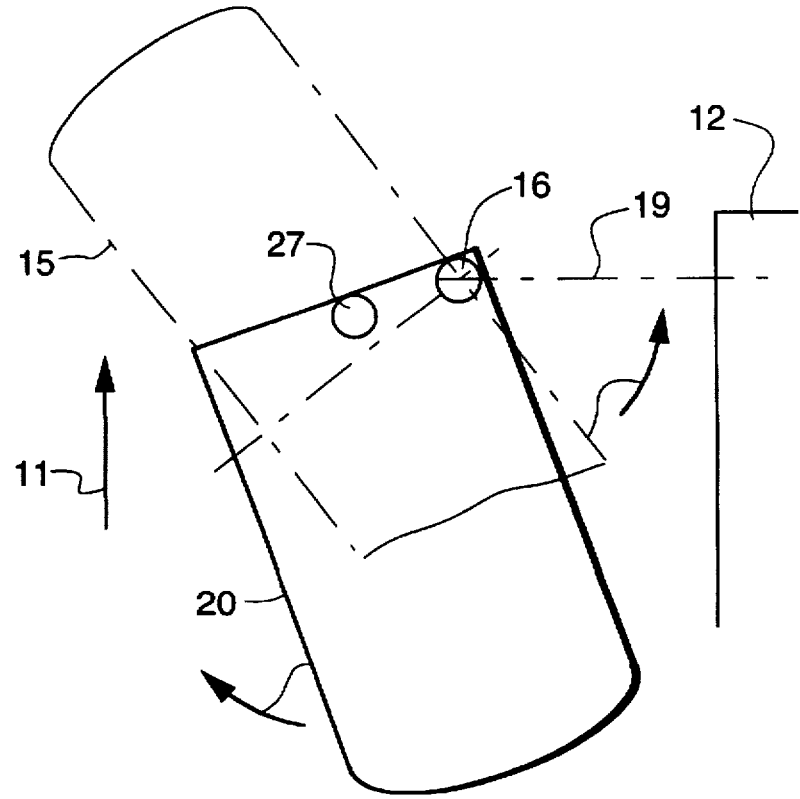
FIG. 5B is a schematic plotting similar to that of FIG. 4B, except corresponding to the view of FIG. 5A with the left front wheel undertaking a left hand turn.
Figure 6A:
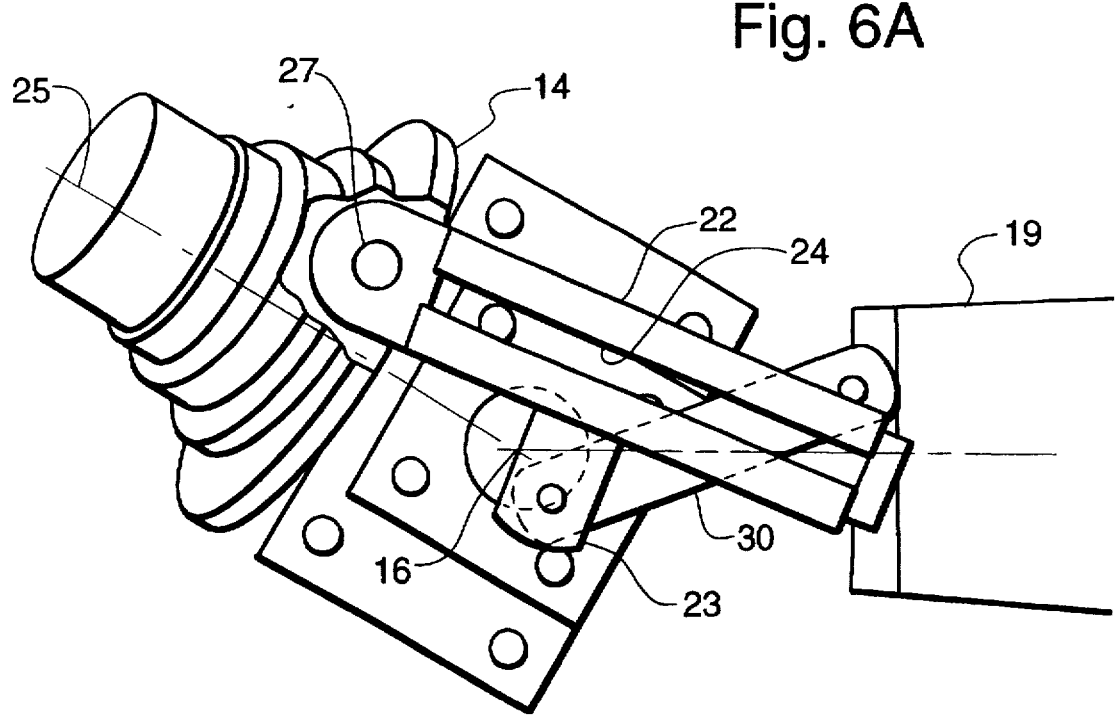
FIG. 6A is an enlarged top plan view of the fender control mechanism similar to that of FIG. 4A, except that the left front wheel has been pivoted to effect a right turn so that the right wheel becomes the outboard wheel on the turn.
Figure 6B:
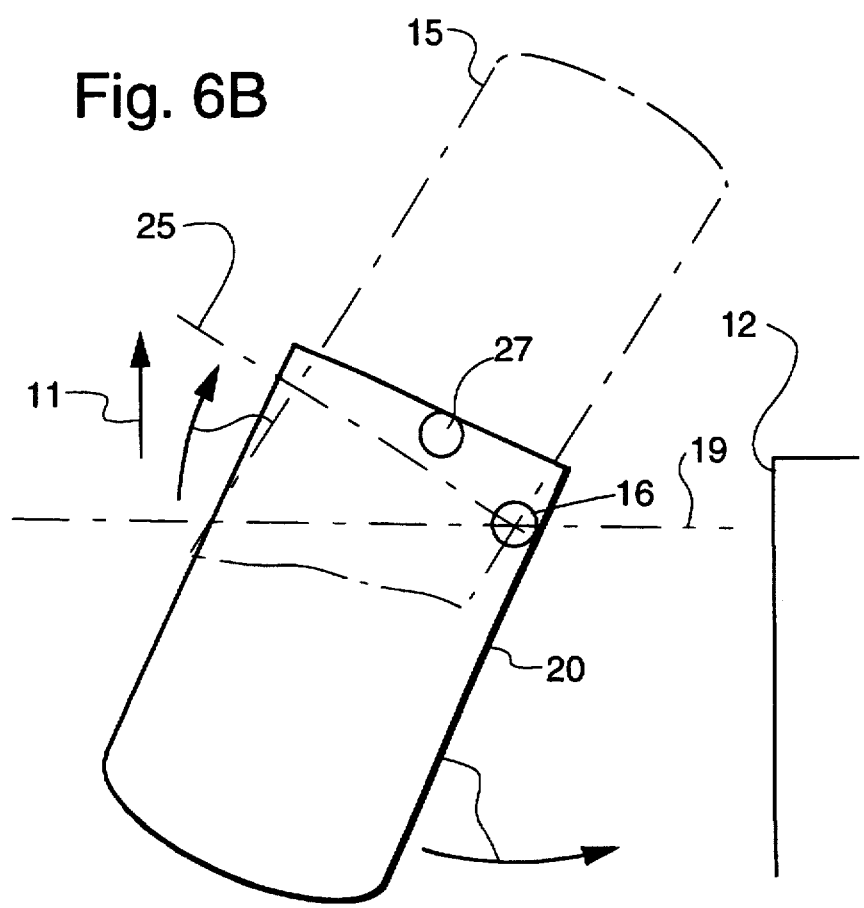
FIG. 6B is a schematic plotting similar to FIGS. 4B and 5B, except corresponding to the view of FIG. 6A with the left front wheel undertaking a right hand turn.

As is best seen in FIGS. 5A through 6B, the rotation of the front wheel 15 about the kingpin axis 16 carries the fender pivot 27 with the front wheel 15. The relative locations of the front wheel 15 and fender 20 relative to the chassis 12 are depicted, as is the forward direction of travel which is indicated by the arrow 11. The control link 30, however, defines a fixed distance between the link pivot member 23 and the axle housing pivot 32 and will not allow the fender base 22 to rotate completely with the spuckle 14. The control link 30, therefore, effects rotation of the fender base 22 about the fender pivot 27, effectively decreasing the angular rotation of the fender base 22 about the kingpin axis 16 as a function of the angular rotation of the spuckle 14 and front wheel 15 about the kingpin axis 16. Because the link pivot member 23 is moved away from the kingpin axis 16 on an inboard turn, as depicted in FIGS. 5A and 5B, as opposed to being drawn toward the kingpin axis 16 on an outboard turn, as depicted in FIGS. 6A and 6B, the fender lag is greater on the inboard turn than on the outboard turn.

Figure 7:
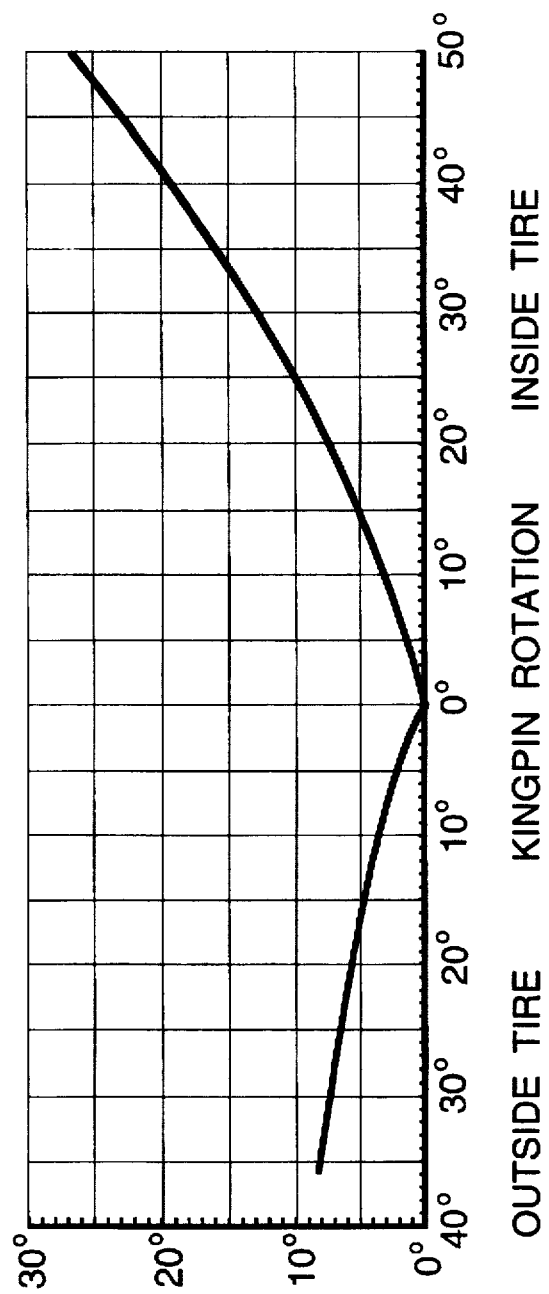
FIG. 7 is a graph plotting the pivotal movement of the fender, identified as "FENDER LAG", relative to the rotation of the corresponding front wheel, identified as "KINGPIN ROTATION", under the conditions of an inboard wheel, identified as the "INSIDE TIRE", and of an outboard wheel, identified as the "OUTSIDE TIRE"

The relative fender lag is graphically depicted in FIG. 7. One skilled in the art will readily see that the fender lag in terms of degrees of rotation is greater for a given amount of angular rotation on an inboard turn than for the same amount of angular rotation on an outboard turn. Furthermore, the total amount of angular rotation for the front wheel 15 about the kingpin axis 16 on an inboard turn is greater than the simultaneous angular rotation of the opposing front wheel 15 undergoing an outboard turn.

As a result, the fender 20 moves toward the tractor chassis 12 slower than the corresponding front tire 15 and effectively pivots away from the chassis 12 during turns without requiring an engagement between the fender 20 and the chassis 12. One skilled in the art will readily understand that the relative movements of the fender 20 and the corresponding front wheel 15 on outboard turns is such that the rear of the fender 20 lags closer to the chassis 12 than the tire 15 on outboard turns, as opposed to inboard turns wherein the tire 15 rotates more toward the chassis 12 than the rear of the fender 20. One skilled in the art will also understand that the control of the front part of the fender 20 on outboard turns is as important as controlling the rear of the fender 20 on inboard turns as the primary goal is to prevent the fender from impacting the chassis 12. Since the greater chance of impact between the chassis 12 and the fender 20 occurs during the inboard turns, the geometry of the components permits a greater amount of fender lag for inboard turns.

Figure 8:
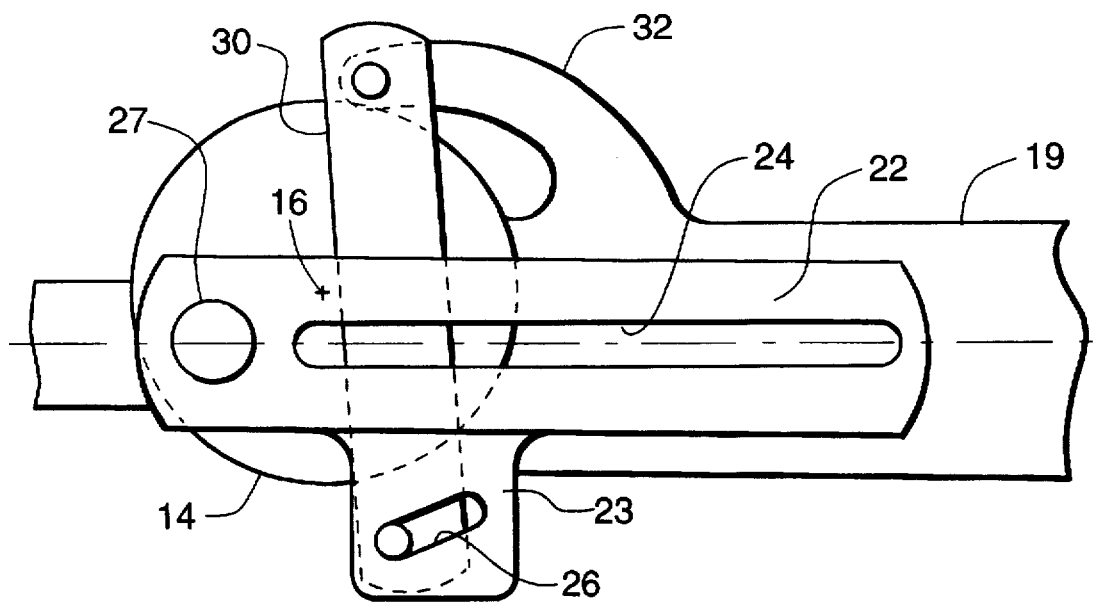
FIG. 8 is an enlarged top plan view of an alternative configuration of the fender pivot control mechanism similar to the view of FIG. 4A, depicting the left front wheel of the tractor.
Figure 9:
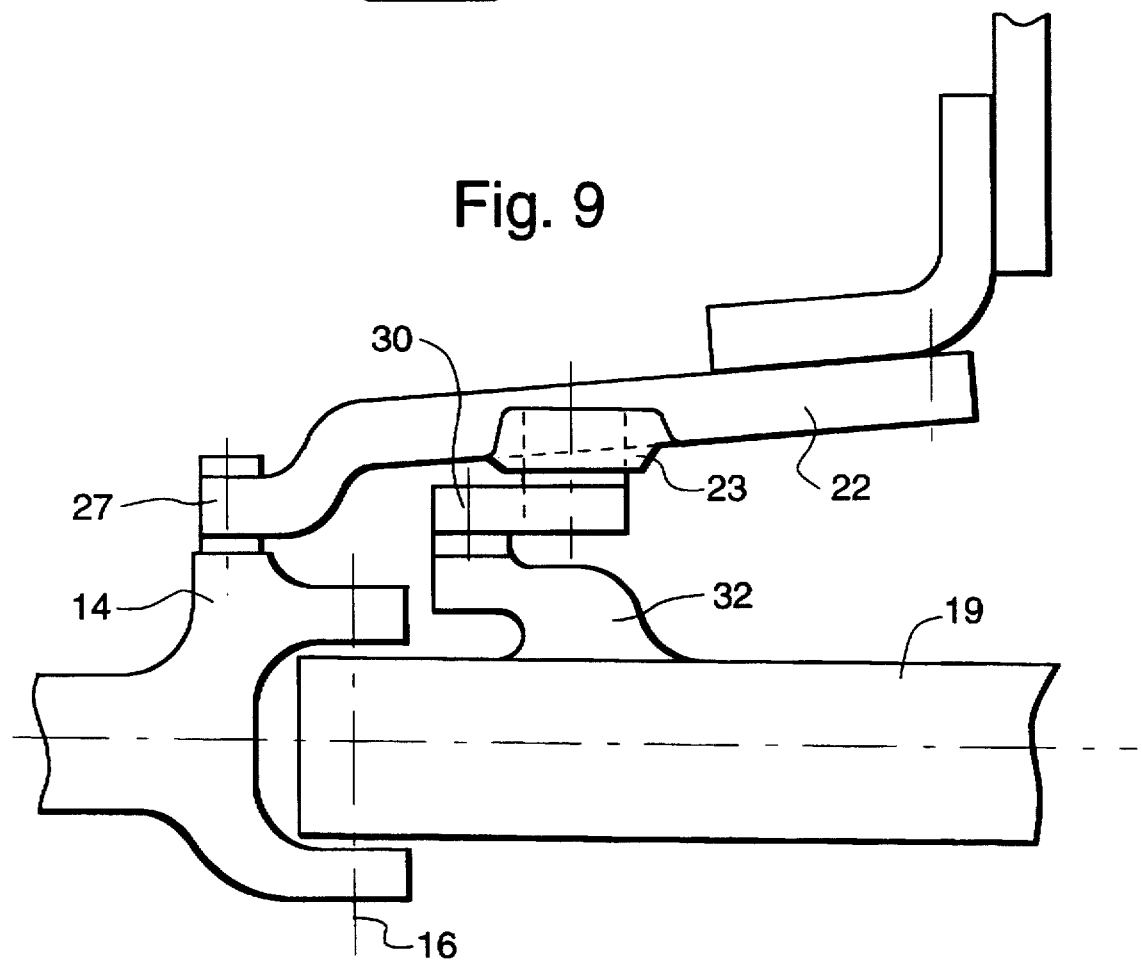
FIG. 9 is a rear elevational view of the alternative configuration shown in FIG. 8.

Referring now to FIGS. 8 and 9, an alternative configuration of the control link 30 can best be seen. The orientation of the link pivot member 23 and the fender pivot 27 are essentially the same as described above with respect to the embodiment in FIGS. 3A–6B. The control link 30, however, is oriented substantially longitudinal with respect to the direction of travel of the tractor 10, as opposed to the substantially transverse orientation described above with respect to the embodiment of FIGS. 3A–6B.

The connection between the control link 30 and the link pivot member 23 incorporates a short slot 26, preferably formed in the link pivot member 23. This short slot 26 provides a limited amount of lost motion between the control link 30 and the fender base 22 so that the fender 20 can be allowed to move fully with the corresponding front wheel 15 during slight inboard turns, which may provide some greater control over the discharge of material from the tire until the front wheels 15 exceed a predetermined amount of angular turn. Although not shown in the drawings, a spring may be preferable to control the utilization of the short slot 26 in this manner.

More importantly, the short slot 26 can be used to relocate the connection point between the control link 30 and the link pivot member 23, placing this connection point further away from the fender pivot 27. This change in geometry will result in an increased amount of fender lag for each increment of angular turn of the wheel 15 about the kingpin axis 16. This increased fender lag is advantageous for narrow transverse spacing between the front wheels 15 as the fender 20 is closer to the chassis 12 than when a wider transverse spacing is provided between the front wheels 15.

Figure 10:
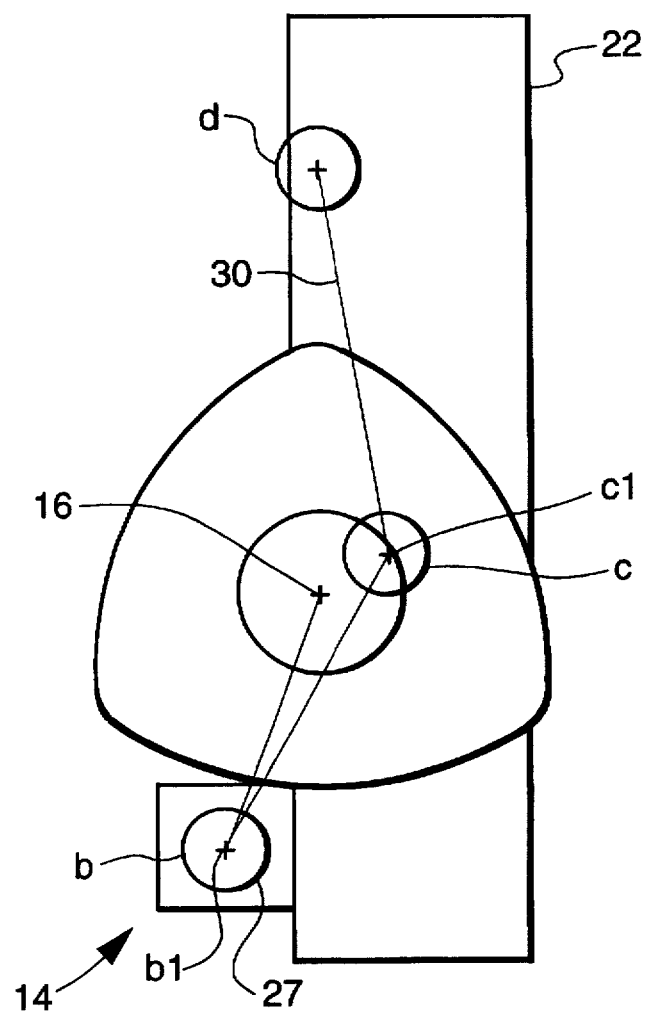
FIG. 10 is a top view of another alternative embodiment taken perpendicular to the kingpin axis.
Figure 11:
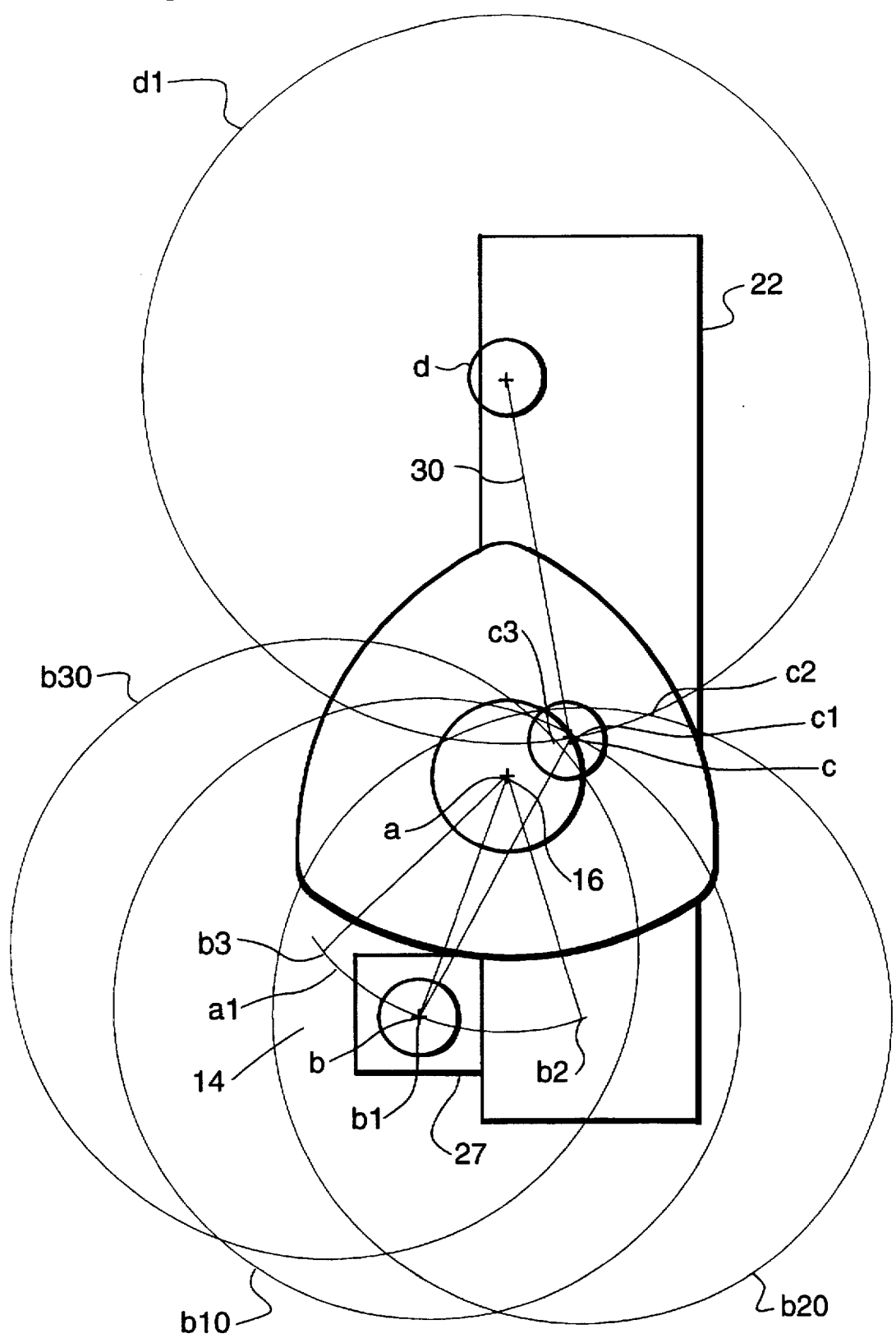
FIG. 11 is a view similar to that of FIG. 10, but demonstrating movement of the wheel in both the inboard and outboard turns.

In the embodiment depicted in FIGS. 10 and 11, the control link 30 is pivotally connected to the front axle 19 at a connection point d beneath the fender base 22 and extends upwardly therefrom to pin to a pivotal connection c1 in the middle of the fender base 22. The connection point c1 is located rearwardly and inboard of the kingpin axis 16 to provide the appropriate geometry as described above. The fender base 22 is again pivotally connected to the spuckle 14 at point b which moves with the spuckle 14 through the arc a1 during the turns of the corresponding front wheel 15. Arc b10 corresponds to the straight-ahead position of the spuckle 14, while arc b20 represents a full inboard turn and arc b30 represents a full outboard turn. The connection point c1, in turn, moves along arc d1 to point c2 at the full inboard turn and to point c3 on the full outboard turn.

More specifically, the fender base 22 pivots about fender pivot 27 at point b on the spuckle 14. When the spuckle 14 is steered about the kingpin axis 16, the pivot b moves along arc a1. As the spuckle 14 is rotated 35 degrees inboard, pivot b moves from position b1 to position b2. Simultaneously, the opposing spuckle 14 is rotated 25.7 degrees outboard, which is represented on the drawing for purposes of convenience at position b3. Connection point c is located on the fender base 22 and moves therewith.

Circles b10, b20 and b30 represents in FIG. 11 the paths that connection point c could possibly move about respective axes b1, b2 and b3. However, the movement of the fender base 22 is also controlled by the control link 30, which is pivotally fixed on the axle 19; therefore, point c must move on arc d1. Thus, point c is always located at the intersection of circle d1 and the movable arc represented by the circles b10, b20 and b30. By studying the circles, one skilled in the art can determine the relationship of the components in the event the circle sizes or centers were changed. The depicted geometry causes the fender to rotate 14.9 degrees when the spuckle 14 is rotated inboard 35 degrees. The corresponding outboard rotation of the spuckle 14 through 25.7 degrees of outboard steer moves the fender 19.1 degrees. These relative amounts of fender lag can be changed by adjusting the linkage geometry.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a chassis supported above the ground by ground engaging wheels, including a pair of transversely opposed steerable front wheels pivotally mounted on a front axle connected to said chassis, said front wheels being pivotally movable relative to said front axle through a steering movement to provide changes in direction of movement of said chassis, each of said front steerable wheels having a fender associated therewith, each said fender being mounted for steering movement with the corresponding said front wheel, the improvement comprising:

each said fender being supported on a fender pivot mechanism that effects a lagged rate of pivotal movement of each said fender relative to the corresponding said front wheel upon a turning movement thereof.

2. The tractor of claim 1 wherein said fender pivot mechanism effects a different lagged rate of pivotal movement of said fender supported thereon relative to the corresponding said front wheel when said corresponding said front wheel is an outboard wheel during said turn as compared to said corresponding said front wheel being an inboard wheel during said turn.

3. The tractor of claim 2 wherein each said fender pivot mechanism comprises:

a fender pivot mounted on the corresponding front wheel for steering movement therewith;

a fender base supported on said fender pivot to be pivotally movable relative to the corresponding front wheel; and a control link pivotally interconnecting said fender base and said front axle to provide a fixed distance between a first point on said fender base and a second point on said front axle and enable the pivotal movement of said fender to lag relative to the pivotal steering movement of the corresponding said front wheel.

4. The tractor of claim 3 wherein said control link is pivotally connected to both said fender base and said front axle to permit a pivotal movement of said fender base relative to both said front wheel and said front axle.

5. The tractor of claim 4 wherein said first pivot is positioned to move closer to a kingpin axis for the steering movement of the corresponding said front wheel when said corresponding said front wheel is said inboard wheel than when said corresponding said front wheel is said outboard wheel.

6. The tractor of claim 5 wherein the pivotal movement of each said fender relative to the corresponding front wheel is such that each front wheel moves closer to the chassis than the corresponding fender on both inboard and outboard turns.

7. The tractor of claim 6 wherein said fender base includes a link pivot member carrying said first pivot for pivotal connection thereof to said control link.

8. The tractor of claim 7 wherein each said front wheel is pivotally supported on said front axle by a kingpin defining said kingpin axis, each said link pivot member being oriented with respect to said kingpin axis such that said link pivot member moves away from said kingpin axis on a turn in one direction and moves toward said kingpin axis on a turn in an opposing direction, thereby providing different fender lag rates for inboard and outboard turns.

9. The tractor of claim 8 wherein said link pivot member is provided with a lost motion slot through which said control link is connected to permit said fender to pivotally move with the corresponding said front wheel without effecting any fender lag relative thereto for a predetermined amount of steering movement of said front wheels.

10. The tractor of claim 9 wherein said front axle is provided with an axle housing pivot to facilitate the pivotal connection of said control link thereto.

11. In a pivotable fender for a front wheel of a tractor, said front wheel being pivotally movable relative to a front axle rotatably supporting said front wheel, such that said front wheel is movable through a steering movement to provide changes in direction of movement of said tractor, the improvement comprising:

a fender pivot mounted on said front wheel for steering movement therewith relative to said front axle;

a fender base supported on said fender pivot to be pivotally movable relative to said front wheel, said fender base supporting said fender for pivotal movement; and a control mechanism operably associated with said fender base to effect a lagging of the amount of pivotal movement of said fender relative to said front wheel as said front wheel undergoes steering movement.

12. The pivotable fender of claim 11 wherein said control mechanism includes a control link interconnecting said fender base and said front axle to provide a fixed distance between a first point on said fender base and a second point on said front axle, said control link enabling a pivotal movement of said fender to lag relative to the pivotal steering movement of the corresponding said front wheel.

13. The pivotable fender of claim 12 wherein said control link is pivotally connected to both said fender base and said front axle to permit a pivotal movement of said fender base relative to both said front wheel and said front axle.

14. The pivotable fender of claim 13 wherein said control mechanism effects a different lagged rate of pivotal movement of said fender supported thereon relative to the corresponding said front wheel when said corresponding said front wheel is an outboard wheel during said turn as compared to said corresponding said front wheel being an inboard wheel during said turn.

15. The pivotable fender of claim 14 wherein said fender base includes a link pivot member projecting outwardly therefrom for pivotal connection to said control link.

16. The tractor of claim 15 wherein each said front wheel is pivotally supported on said front axle by a kingpin defining a kingpin axis, each said link pivot member being oriented with respect to said kingpin axis such that said link pivot member moves away from said kingpin axis on a turn in one direction and moves toward said kingpin axis on a turn in an opposing direction, thereby providing different fender lag rates for inboard and outboard turns.

17. The tractor of claim 16 wherein said link pivot member is provided with a lost motion slot through which said control link is connected to permit said fender to pivotally move with the corresponding said front wheel without effecting any fender lag relative thereto for a predetermined amount of steering movement of said front wheels.

18. The tractor of claim 17 wherein said front axle is provided with an axle housing pivot to facilitate the pivotal connection of said control link thereto.

19. The tractor of claim 11 wherein the pivotal movement of each said fender relative to the corresponding front wheel is such that each front wheel moves closer to the chassis than the corresponding fender on both inboard and outboard turns.

* * * * *